(No Model.)

C. A. SINGEWALD.
HOOD FOR STOVES.

No. 587,766. Patented Aug. 10, 1897.

Witnesses
Edwin G. McKee
J. D. Carlinger

Inventor
Charles A. Singewald
By his Attorneys,
C. A. Snow & Co.

UNITED STATES PATENT OFFICE.

CHARLES A. SINGEWALD, OF BALTIMORE, MARYLAND.

HOOD FOR STOVES.

SPECIFICATION forming part of Letters Patent No. 587,766, dated August 10, 1897.

Application filed May 7, 1897. Serial No. 635,530. (No model.)

*To all whom it may concern:*

Be it known that I, CHARLES A. SINGEWALD, a citizen of the United States, residing at Baltimore, in the State of Maryland, have invented a new and useful Hood for Stoves, of which the following is a specification.

This invention relates to certain improvements in hoods such as are adapted for use in connection with cooking stoves and ranges, and has for its object to provide a device of this character of a simple and inexpensive nature which shall be adapted to collect the vapors and smoke produced in cooking and discharge them into the stove, so as to prevent them escaping into the room.

The invention consists in certain novel features of the construction, combination, and arrangement of the various parts of the device, whereby certain important advantages are attained and the hood is made simpler, cheaper, and otherwise better adapted and more convenient for use, all as will be hereinafter fully set forth.

The novel features of the invention will be carefully defined in the claim.

In order that my improvements may be the better understood, I have shown in the accompanying drawings a hood constructed according to my invention, in which drawings—

Figure 1:
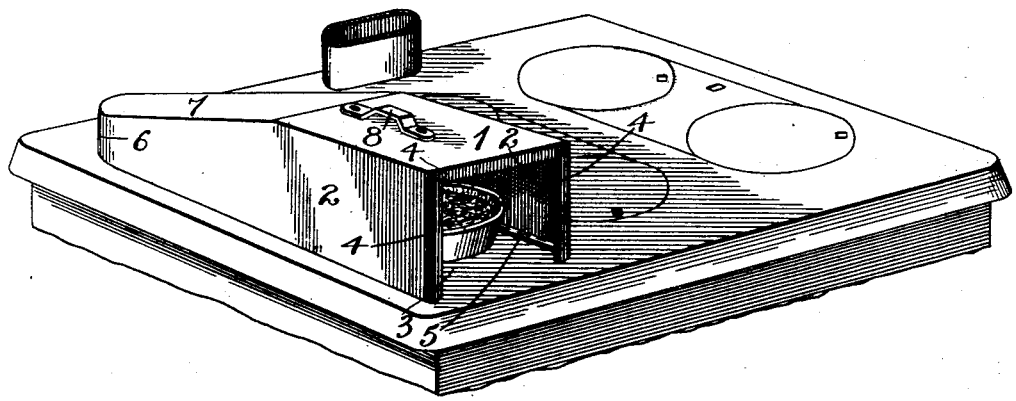
Figure 2:
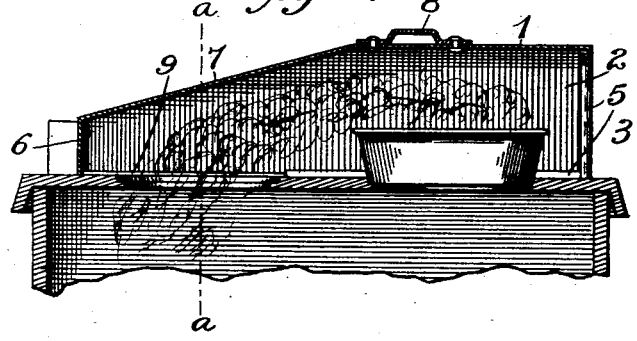
Figure 3:
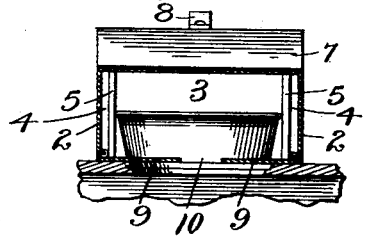
Figure 4:
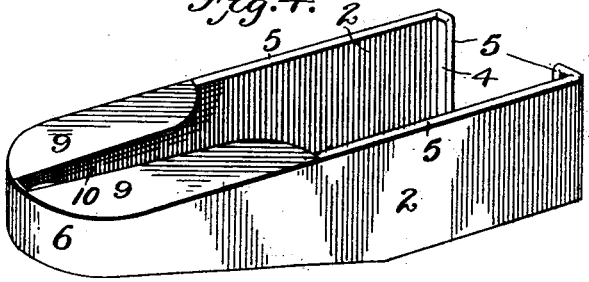

Figure 1 is a perspective view showing the improved hood as it appears in use, and Fig. 2 is a sectional view taken longitudinally through the hood and also through the stove-top. Fig. 3 is a transverse section in the plane indicated by the line $a\ a$ in Fig. 2, and Fig. 4 is a perspective view showing the under side of the improved hood.

The improved hood is constructed, as herein shown, from sheet metal of an elongated form having a flat top 1 and parallel side walls 2 2, the front of the hood being open, as indicated at 3 in the drawings, and the front edges of the top and sides 1 and 2 being provided with inturned flanges 4 at the edges of said open front. In order to properly strengthen and reinforce the hood, the edges of the metal whereof it is formed are wired, as indicated at 5 in the drawings.

The sides 2 of the device are preferably formed integral with the top and with a curved portion 6, which forms the back wall of the hood, and the rear portion of the hood is made with a sloping closed top or roof-plate 7, the flattened portion 1 of the top at the forward end of the hood being provided with a handle 8, secured thereon by means of rivets or equivalent devices, so that the hood may be conveniently lifted.

As shown in Fig. 2, the improved hood is adapted to be set flat upon the top of the stove over a pan or the like containing the food to be cooked, the stove-lid immediately behind the pot or vessel being also removed from the stove, so that the hole closed by said lid is open, and the improved hood, as indicated in the drawings, is of such a length that when applied over the pot or vessel, as shown in Fig. 2, its rear portion will also extend over the open hole in the top of the stove.

In this way it will be seen that the vapors arising from the pot or vessel over which the hood is applied will be conducted back through the hood and discharged through the open hole in the top of the stove inside the same, so that they will be consumed and passed up the chimney; but in practice it is found that where the hole in the top of the stove at the rear of the pot or pan is left open the fire will soon become dead, and in order to prevent this I provide the rear end of the hood with a bottom 9, having a central aperture extending longitudinally in it, as shown at 10 in Fig. 4, said aperture being, as clearly indicated in the drawings, of a tapered form and having its widest portion directed toward the front end of the hood.

As shown in the drawings, the bottom 9 at the rear end of the hood is formed of two plates secured to the opposite sides 2 of the hood, but, if desired, it is evident that these plates may be formed integral with said sides and bent over at right angles thereto to form the bottom of the hood.

In operation the hood is placed upon the top of the stove, over the pot or vessel, and the vapors from the pot or vessel will be drawn backward through the narrow opening 10, between the plates of which the bottom 9 at the rear end of the hood is formed, and will pass into the stove instead of escaping into the room, and in this way it will be seen that should the material contained in the pot or vessel become burned or scorched the smoke therefrom will also be drawn back within the hood and prevented from escaping into the room. Furthermore, the construction of the hood with the narrow opening in the closed rear portion of its bottom prevents the fire from becoming dead when the cover is removed from the stove-hole and also insures a draft through the narrow opening 10, so as to prevent the material contained in the pot or vessel from catching fire owing to the igniting of the vapors.

The device constructed as above described is extremely simple and inexpensive in character and is especially well adapted for the purposes for which it is designed, and it will be obvious from the above description that the invention is capable of some modification without material departure from its principles and spirit, and for this reason I do not wish to be understood as limiting myself to the precise form and arrangement of the parts herein set forth.

Having thus described my invention, I claim—

The herein-described hood for stoves formed with its top, sides and back closed and its front wall open, the under side of the device being open at its forward end and being provided with a bottom at its rear end, and said bottom being formed with a contracted opening adapted when the hood is arranged upon the stove to afford communication between the interior of the hood and the stove-hole, whereby a draft will be formed to carry the vapors from the hood into the stove without entirely opening the stove-hole, substantially as set forth.

In testimony that I claim the foregoing as my own I have hereto affixed my signature in the presence of two witnesses.

CHAS. A. SINGEWALD.

Witnesses:
 FRED. W. TROXELL,
 M. J. GERAGHTY.